July 23, 1935.  A. L. SMITH  2,008,934
LEAK DETECTOR FOR PIPE LINES
Filed April 11, 1933   2 Sheets—Sheet 1

INVENTOR.
A. L. Smith
BY Jesse R. Stone
Lester B. Clark
ATTORNEYS.

July 23, 1935.  A. L. SMITH  2,008,934
LEAK DETECTOR FOR PIPE LINES
Filed April 11, 1933  2 Sheets-Sheet 2
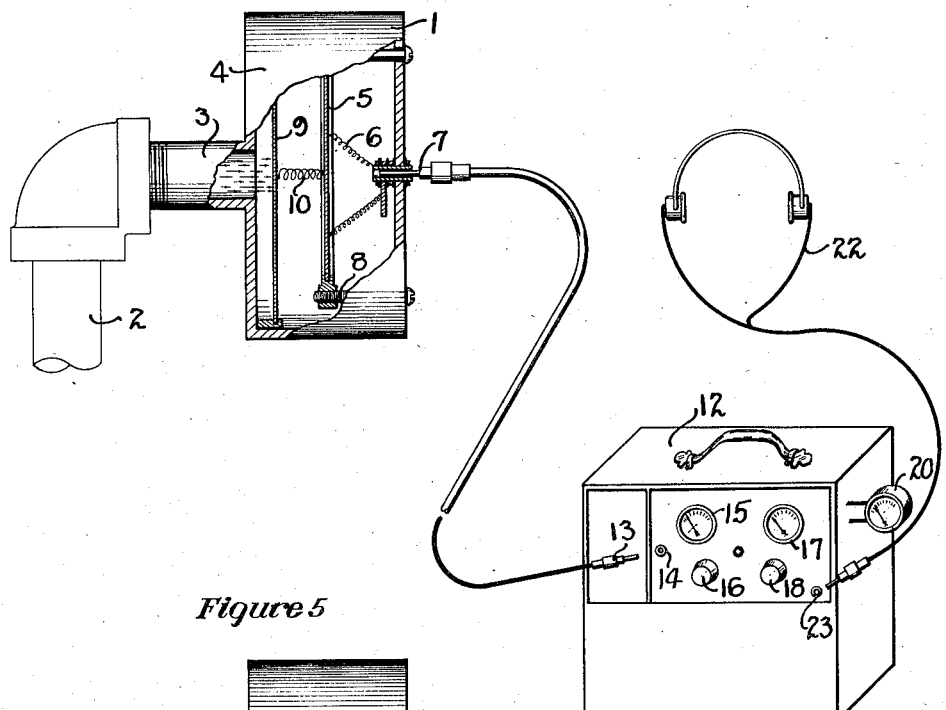
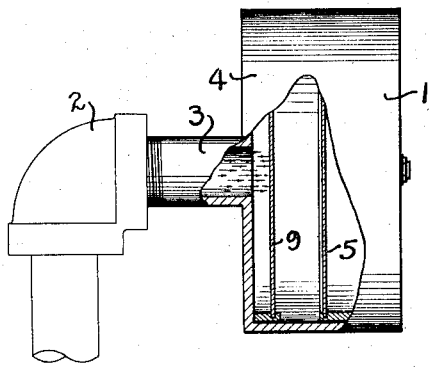
INVENTOR.
A. L. Smith
Jesse R. Stone
Lester B. Clark
BY
ATTORNEYS.

Patented July 23, 1935

2,008,934

UNITED STATES PATENT OFFICE 2,008,934

LEAK DETECTOR FOR PIPE LINES

Alonzo L. Smith, Houston, Tex.

Application April 11, 1933, Serial No. 665,495

13 Claims. (Cl. 137—77)

The invention relates to an improvement in means and method of locating leaks particularly from pipe lines by detecting and measuring the density of the sound caused by the fluid leaking from the pipe.

In connection with the leakage from buried pipe lines it seems obvious that considerable difficulty would be encountered in detecting the exact as well as the approximate location of points of leakage. The present practice is to either uncover the pipe line to repair the leaks or, as applied to gas lines, what is known as the bar test is used, which consists of forming an opening directly above the pipe line and inserting an instrument which indicates the presence of gas in the hole which is formed. This method, however, is not only costly but inaccurate unless the holes are made very close together because in many instances the gas escapes from the leak and travels along the pipe so that it may be present in an opening which is many feet from the leak. With the object therefore of reducing the cost of testing lines and of making the tests more accurate, the present means and method has been developed.

It is one of the objects of the invention to provide a method whereby the sound caused by the escaping fluid may be detected and measured as an indication of the location of the leak with respect to the point where the sound is detected.

Another object of the invention is to provide a method of locating leaks in buried pipes by measuring the sound caused by the escaping fluid at a plurality of spaced points and by comparing the intensity of the sound and determining the location of the leak.

Another object of the invention is to insert a sound detector in the pipe to be tested in order to pick up the sound caused by the leaking fluid.

Another object of the invention is to determine whether there is an unauthorized taking of fluid from the pipe.

Another object of the invention is to detect traps or stoppage points in the pipe line by detecting a sound either present or injected into the pipe.

Another object of the invention is to detect the location of feed lines by injecting a sound in one line and attempting to detect the sound in another line as an indication of whether the two lines are connected.

A still further object of the invention is to move a sound indicating apparatus within the pipe line at known locations in order to pick up the sound caused by escaping fluid.

It is also an object of the invention to measure the intensity of the leak from the surface of the ground as an indication of the location of the leak.

A still further object of the invention is to devise a sound rod and a vibration carriage in order to measure the intensity of the sound transmitted by the pipe line as an indication of the location of the leak from the line.

It is an object of the invention to provide a sound pick up unit to be used in practicing the invention so that the pressure of the fluid in the pipe is withheld from the sound diaphragm.

It is an object of the invention to improve the general system and apparatus for detecting leaks in buried pipes, and with this in mind the further advantages of the invention will be readily apparent when the following description is considered in connection with the accompanying drawings.

Fig. 4 shows an arrangement of the sound pick up unit attached to a pipe line and illustrates also the amplifying apparatus to be used.

Fig. 5 is an elevation partly broken away illustrating a modified form of the sound pick up unit, or microphone.

Figure 1:
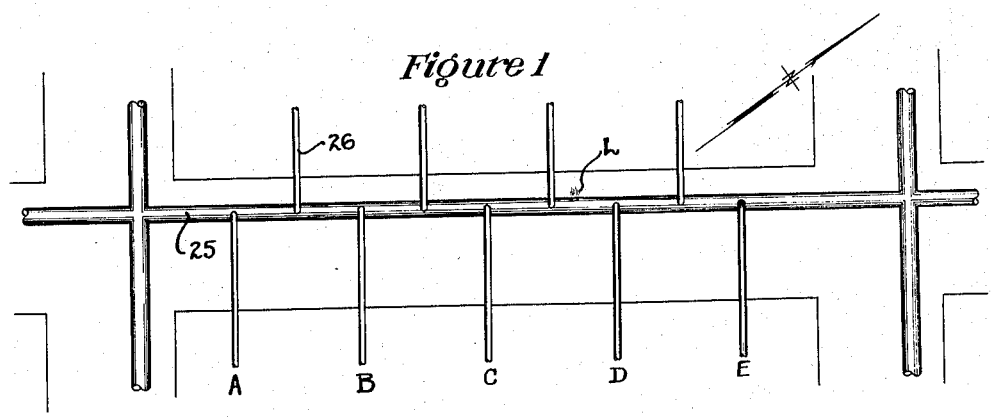
Fig. 1 is a diagrammatic illustration of the procedure to be used in testing service lines such as the distribution pipes for gas, oil or water.

It is to be understood that in practicing the invention suitable sound pick up mechanism may be used. Figs. 4 and 5, however, show two specific forms of pick up unit which are connected to the pipe line to be tested. In Fig. 4 the pipe is indicated at 2 and may be any pipe through which fluid is being transmitted where it is believed that there may be a leakage. In order that the invention may be readily understood it will be now described as applied to distribution lines for fuel gas. The invention, however, is not limited to this type of pipe line, because it may be applied to any distribution system. In Fig. 4 the pipe 2 may be the service connection of a customer where the meter is attached, or it may be any suitable riser in the pipe line or distribution system. If it is a service connection the meter may be uncoupled and the nipple 3 screwed into or attached to the pipe. The sound pick up unit 1 comprises a housing 4, which may be made integral with or attached to the nipple 3 and which contains the sound pick up diaphragm 5. This diaphragm is suitably mounted in the housing 4 and is arranged to transmit its vibrations through the springs 6 to the electrical connection 7, which serves the same purpose as the connection to the usual and well known microphones used in radio broadcasting. The screws 8 are shown as supporting the diaphragm 5.

In view of the fact, however, that there may be considerable pressure within the pipe line 2, this pressure might affect the operation of the sound pick up diaphragm 5 so that a pressure diaphragm 9 has been provided. This diaphragm may be suitably mounted within the housing so that the pressure flowing from the nipple 3 will be trapped within the housing and withheld from the sound pick up diaphragm 5. In order that the impact of the sound against the pressure diaphragm 9 may be transmitted to the sound diaphragm Fig. 4 shows a hair spring 10 connected to each of the diaphragms. This spring transmits the sound vibration.

In order that the sound picked up by the unit 1 may be amplified for the purpose of observing or indicating its intensity, the amplifying unit 12 has been provided. The connection 7 is provided with a plug 13 which may be inserted at 14 into the amplifying unit. The amplifying unit may be of any desired type which will permit the measurement of the intensity of the sound transmitted over the connection 7. With this in mind, a milli-amp meter 15 has been provided. The knob 16 is used to adjust the plate current consumption of the amplifying unit. The voltmeter 17 is provided and the knob 18 is used to adjust the voltage applied to the amplifying unit.

It is intended that the amplifying unit will serve to measure the intensity of the sound received and the intensity meter 20 is so designed that readings therefrom may be recorded and the readings from different locations compared with a view of locating the leak by comparative intensities. A pair of head phones 22 may be plugged into the unit at 23 as a further indication of the location of the leak in addition to the intensity observed on the meter 20. It has been found that by use of the head phones 22 the character of the leak can sometimes be determined by the type of sound received. The sound caused by escaping fluid may be segregated from other sounds transmitted through the pipe and additional information obtained by the use of these head phones.

Fig. 5 shows a modified form of the invention wherein the sound diaphragm 5 and the pressure diaphragm 9 are the same as in Fig. 4, except that the sound diaphragm is fixed in the housing 4 the same as the pressure diaphragm. In this form of invention, however, the springs 6 and 10 have been omitted and the air trapped between the diaphragms and inside of the housing 4 serves to transmit the sound vibrations.

In order that the method of practicing the invention as applied to distribution lines may be understood, reference is had to Fig. 1, a distribution system being indicated by the main pipe 25 from which extend the distribution pipes or service lines 26. A plurality of these lines have been shown such as would extend from a gas distribution system. The service connections are indicated at A, B, C, D and E, and represent the connection which would be made to the main pipe 25 within a specified area such as a city block. If this block is to be tested to determine whether the section of the main 25 and the service lines 26 are clear of leakage, then the sound pick up unit 1 and the amplifying unit 12 will be connected to one of the service lines 26 such as A. For purposes of simplicity in this description, the sound pick up unit and the amplifying unit will be designated as a soundograph. The soundograph is connected to the service line A and the intensity of the sound observed on the meter 20. Any arbitrary indicia may be used on the meter 20. After the intensity has been observed at A the soundograph is moved to B and the operation repeated. At B it is found that the intensity is slightly greater than at A, which indicates that the leak in the system is closer to the line B than to A.

The service line C is next tested and in the present illustration it is found that the intensity of the sound is still greater at C than it was at either B or A. This indicates that the leak is closer to C so that the connection D is next tested and it is noted that the intensity, while slightly greater at C, does not differ as much as the intensity between A and B, and B and C, respectively. To an experienced operator this indicates that the leak is probably between C and D. In order to be positive, however, the service connection E is tested and it is found that the intensity is considerably less than at D. With this information in mind, the operator is then aware of the fact that the leak is between C and D and, by comparing the intensities at C and D he is able to determine the approximate location of the leak. The leak is indicated at L and as observed is slightly closer to D than to C. If the cost of excavating the pipe line is slight an excavation may be made at the approximate location of the leak and the leak repaired. If, however, the distribution pipe is located in a congested business section where the cost of excavating would be considerable, the bar test previously described may be used and the exact location of the leak determined.

Figure 3:
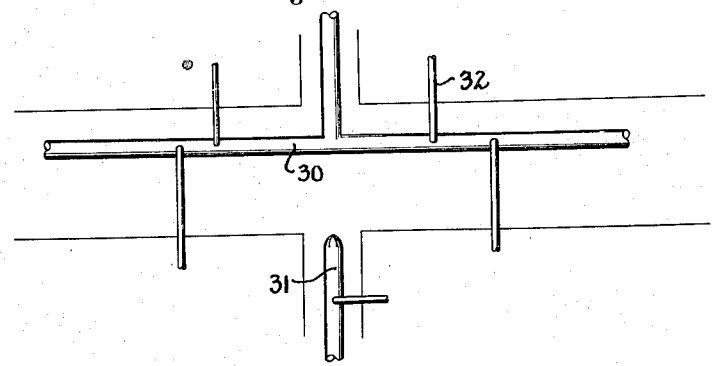
Fig. 3 illustrates a system of piping where the invention may be used to determine whether the pipes are connected together.

Fig. 3 shows a pipe line 30 and another pipe 31. These pipes may be the property of the same company or of other companies and it is desired to determine whether there is any connection between the pipes 30 and 31. With this in mind the soundograph may be connected either directly to the pipe 30 or to one of the service connections 32 adjacent the pipe 31. After the soundograph has been connected then a sound may be injected into the pipe 31. If this sound applied to the pipe 31 is observed on the soundograph, of course, it is apparent that there is a connection between the pipes 30 and 31 and the information desired has been obtained. This method is used particularly in determining whether a service connection might be an unauthorized connection, and also, where the location of the pipe lines is not certain, observations may be made to determine whether adjacent pipes are connected or are independent of each other.

Figure 2:
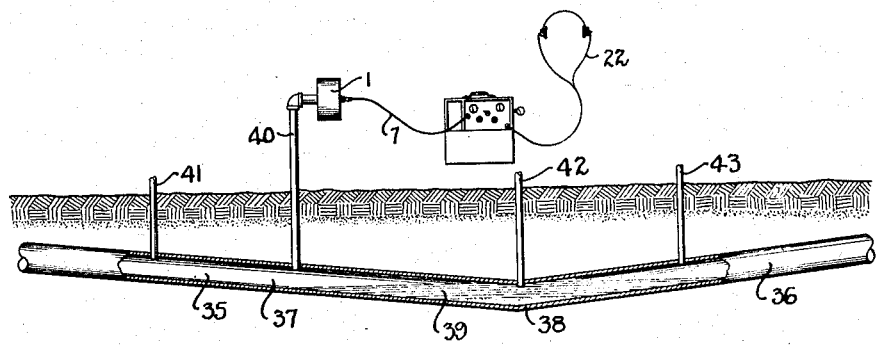
Fig. 2 is a vertical sectional view of a buried pipe line in which there is a trap or stoppage which is to be located.

Fig. 2 shows the invention utilized for the purpose of locating pockets of liquids or solids accumulated in the pipes and for locating traps in the pipe lines. The pipe line is indicated generally at 35 and is made up of the sloping section 36 and 37, which form the depression 38. A liquid such as water is shown at 39 as having accumulated in the low spot in the pipe. If the flow through the pipe is blocked the present apparatus may be used to locate the pocket in the pipe and the soundograph under these circumstances can be attached to any riser or service pipe 40 and the soundograph unit connected to the pipe.

Some other service connection or pipe such as 41 may then be opened so that there will be a movement of the fluid in the pipe. If the sound of this fluid escaping from the pipe 41 is clearly heard at 40, it is then evident that there is no blockade between the pipes 40 and 41. This procedure may be repeated with the pipes 42 and 43 or with the pipes 40 and 43, so that the blockade in the pipe may be accurately located.

When the blockade has been definitely positioned between any two or three of the pipes then a bar may be sunk through and around it to engage the pipe. The pipe can then be tapped with this bar and by making a plurality of holes between the services 40 and 43 the blockade can be accurately located because if the pipe at the position struck by the bar is filled with the blocking material there will be more or less a solid impact detected on the soundograph, whereas if the pipe is struck where there is no blockade, then a hollow sound will be received in the soundograph. An excavation can be then made and the blockade removed.

While the invention has been described and shown as being practiced in several forms, it is intended that various modifications and alterations may be made in the method and apparatus without departing from the spirit of the appended claims wherein it is intended that the invention broadly contemplates the detecting of leakage from containers by observing the sound caused by the escaping fluid.

What is claimed is:

1. A method of detecting leaks in gas lines including picking up the sound transmitted by the fluid in the pipe which has been caused by the gas leaking from the pipe, amplifying the sound picked up, and measuring the volume and intensity of the sound as an indication of the location of the leak with respect to the point of pick up.

2. A method of detecting the location of fluid discharging from pipes comprising detecting the sound caused by the escaping fluid which is transmitted by the fluid in the pipe, and observing the detected sound as an indication of the discharge location.

3. A method of detecting the location of fluid leaking from pipes comprising detecting the sound caused by the escaping fluid, and measuring the detected sound transmitted by the fluid in the pipe as an indication of the leak location.

4. A method of locating leakage from buried pipe lines including measuring at a plurality of points the intensity of the sound caused by the fluid leaking from the pipe and comparing the intensities of the sound transmitted by the fluid in the pipes to the different points to locate the leak.

5. A method of locating leaks in distribution pipes, comprising detecting the sound of the fluid leaking from the pipes which is transmitted to a plurality of spaced points on the pipes, measuring the intensity of the sound transmitted to each point, and coordinating the intensities as an indication of the location of the point of leakage with respect to two of the spaced points.

6. A method of surveying pipe line distributing systems to determine the points of leakage comprising amplifying the sound transmitted by the fluid in the pipes caused by the escaping fluid, measuring the sound, and comparing the measurements as an indication of the location of the leaks.

7. A method of locating obstructions in pipe lines comprising setting up sound vibrations in the fluid in the pipe, observing the intensity of the vibrations of the fluid at a point spaced from the source as an indication of the location of the obstructions between the point of observation and the source.

8. In the art of detecting leakage from buried containers comprising the steps of positioning a sound pick up unit in engagement with the container in order to detect sound transmitted by the fluid, observing the sound set up in the fluid in the container by the escaping fluid, and measuring the intensity of the sound.

9. An apparatus for use in detecting leakage from pipe lines comprising a microphone, means to connect said microphone to the pipe being tested to pick up sound in the fluid caused by the fluid leaking from the pipe, and means to measure the intensity of the sound as an indication of the distance of the point of leakage from the location of said microphone.

10. A sound pick up unit for connection to gas pipe lines including a housing, a diaphragm to pick up sounds transmitted by the gas in the pipe and to withstand the pressure of the gas in the pipe, a sound pickup diaphragm, means to transmit the sound thus picked up from said first diaphragm to said sound diaphragm, and means to amplify the sound picked up.

11. In a sound pick up device for use in detecting leakage from containers, a microphone adapted to pick up from the fluid in the container the sound caused by the leakage, means to connect the microphone to the leaking container, and means operable in proportion to the sound caused by the leaking to indicate the intensity of the sound whereby the location of the leak may be determined.

12. A leak detector for pipe lines including in combination a microphone, means to connect said microphone to the pipe to be tested, a diaphragm in said microphone exposed to the pressure in the pipe, a sound diaphragm to pick up the vibration of said first diaphragm caused by the sound of the leaking fluid transmitted thereto by the fluid in the line, and amplifier means to indicate volume of the sound.

13. An apparatus for testing gas distribution systems for leakage including a microphone, means to attach said microphone to a service pipe of the system so that the sound transmitted from the point of leakage by the gas in the pipe may be picked up by the microphone, and means to indicate the intensity of the sound whereby the location of the leak with respect to that service connection may be determined.

ALONZO L. SMITH.

DISCLAIMER 2,008,934.—*Alonzo L. Smith*, Houston, Tex. LEAK DETECTOR FOR PIPE LINES. Patent dated July 23, 1935. Disclaimer filed November 22, 1935, by the patentee.

Hereby enters this disclaimer as follows:

As to claims 2, 3, 4, 5, 6, and 7, any method of detecting leakage from pipes, except where the fluid escaping from the pipe is a gaseous fluid.

From claim 8, any method of detecting leakage from containers, except where the fluid escaping from the container is a gaseous fluid.

From claims 9 and 11 any device except that which is capable of picking up the sound carried by a gaseous fluid.

[*Official Gazette December 17, 1935.*]